Feb. 8, 1944. A. A. SCHWARTZ ET AL 2,341,194
MILLING MACHINE
Filed Sept. 10, 1940 6 Sheets-Sheet 5

Arthur A. Schwartz
& Le Roy F. Maurer,
INVENTORS

BY
Bean, Brooks, Buckley & Bean.
ATTORNEYS

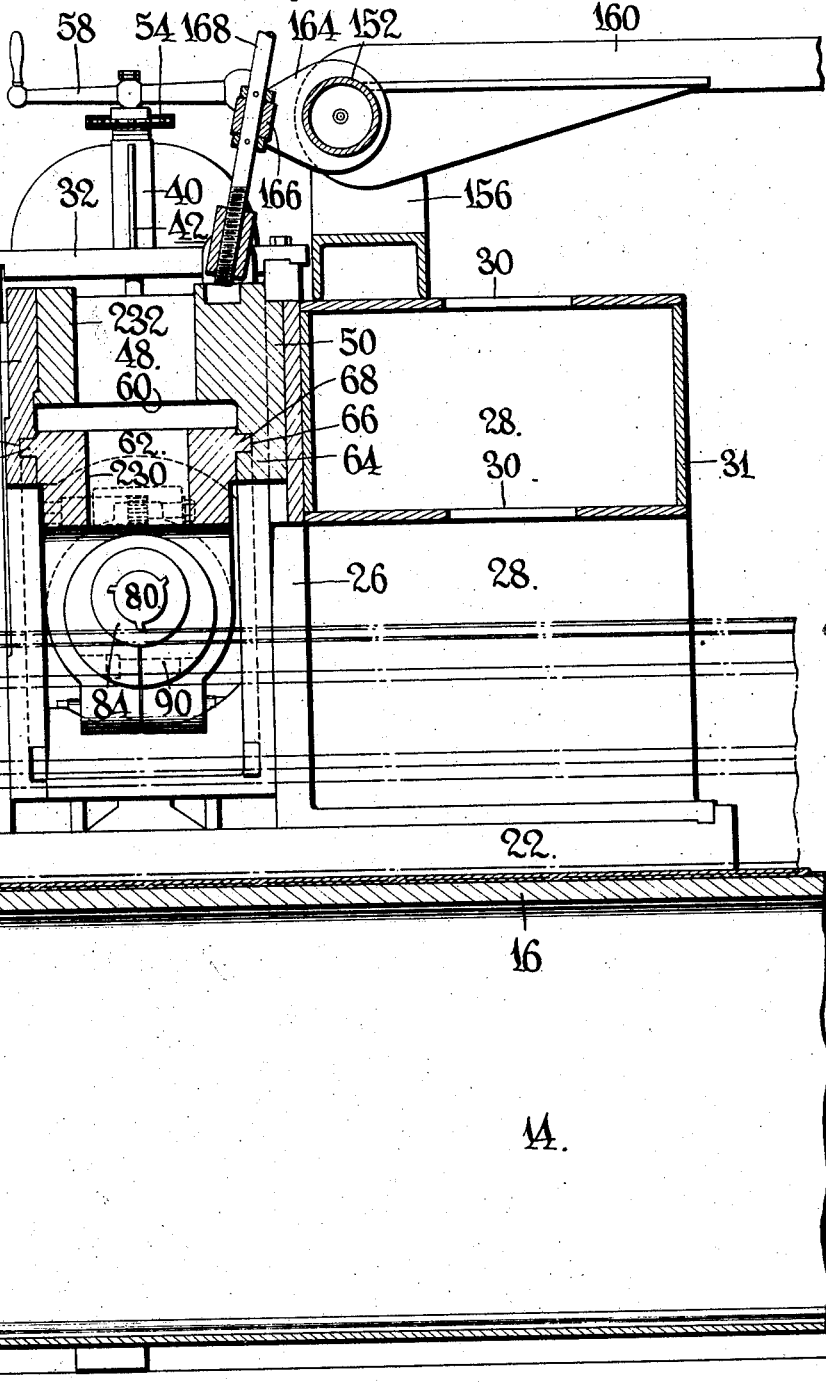

Patented Feb. 8, 1944

2,341,194

UNITED STATES PATENT OFFICE 2,341,194

MILLING MACHINE

Arthur A. Schwartz and Le Roy F. Maurer, Buffalo, N. Y., assignors to Bell Aircraft Corporation, Buffalo, N. Y.

Application September 10, 1940, Serial No. 356,142

15 Claims. (Cl. 90—13)

This invention relates to machine tools and more particularly to improvements in template controlled milling machines.

One of the objects of the invention is to provide an improved and simplified machine tool of the character described which is adapted to perform effectively and efficiently a selected machining operation on successive work blanks in accurately duplicated manner. Another object of the invention is to provide an improved machine tool of the character described which is particularly adapted to accurately mill work blanks into twisted and/or tapered surface form. Another object of the invention is to provide an improved machine tool of the character described which is adapted to variably mill a work blank along its length. Another object of the invention is to provide an improved machine tool of the character described which is adapted to simultaneously mill different portions of a work blank in an improved manner. Another object of the invention is to provide a milling machine that embodies a relatively rapidly revolving cutter mounted as an integral portion of a relatively heavy supporting mass, whereby tendencies of the cutter to chatter are effectively damped and an improved milling action is obtained.

Other objects and advantages of the invention will appear in the specification herein.

In the drawings:

Fig. 1 is a front end elevation of a machine embodying the invention and which is particularly adapted to mill twisting airplane wing spars, or the like;

Fig. 6 is a fragmentary longitudinal vertical section taken along line VI—VI of Fig. 4.

Figure 5:
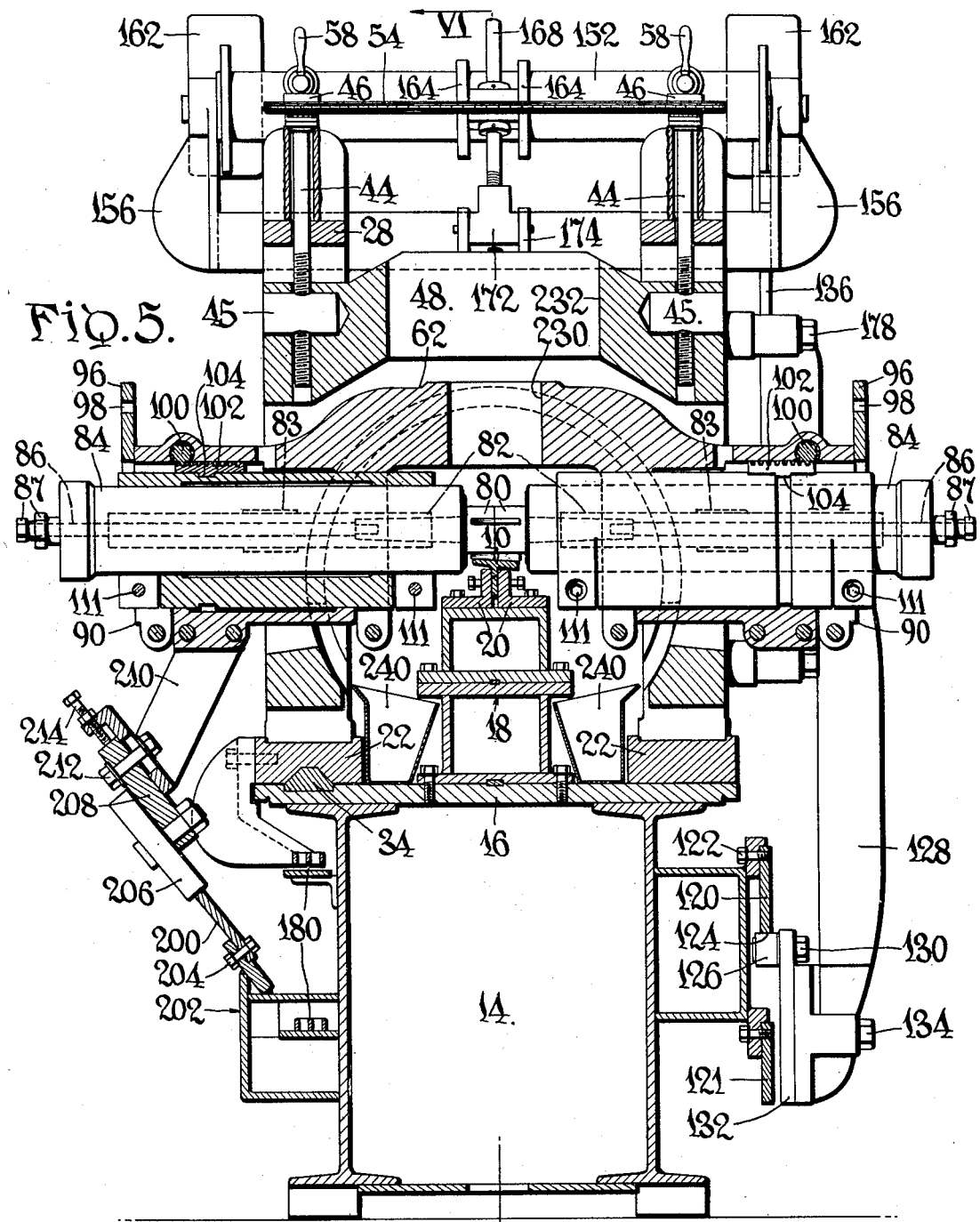
Fig. 5 is a vertical transverse section taken substantially along lines V—V of Fig. 4.

The invention is illustrated in the drawings as being embodied in a machine for milling the cap and/or web portions of T-sectioned twisting and tapering airplane wing spars, a typical work blank for a spar member of this type being illustrated in Fig. 5 as mounted in milling operation position upon the machine and designated by the numeral 10. The blank 10 may have been previously formed by extruding, casting, forging, rolling, or some other suitable metal shaping operation into standard stock form so as to be adapted to be dressed down to final form by milling upon a machine of the invention.

The machine illustrated herein includes a base 14 which is fabricated of I beams and cross plates and supports a bed plate 16 providing a base for the work support structure 18. As shown in Fig. 5, the work support 18 is illustrated as being fabricated of a plurality of structural elements to adapt it to support the work blank at the proper elevation relative to the cutters of the machine, and it will be understood that the work support 18 will be varied in its formation and dimensions so as to suit it to support different forms of work blanks in operative position. Clamps 20 are illustrated as being bolted to the upper portion of the work support for holding the work blank 10 in operative position, but it will be understood that any other suitable form of work holding means may be employed within the concept of the invention.

The bed plate 16 is smothly surfaced at its upper marginal edge portions so as to slidably support thereon a pair of opposed rails 22 which constitute the base of a milling head carrier designated generally by the numeral 24. The carrier 24 comprises a structure including four spaced upright posts 26 which are oppositely paired and based upon the rails 22 to provide a box-like frame for carrying the milling head portion of the machine. The two rear posts 26 are illustrated as being formed with integral rearwardly extending upright plates 28 which are transversely connected by horizontal plates 30 (Fig. 6) and vertical plates 31, thus providing altogether a rigid box-like structure which is slidably mounted upon the bed plate 16. The front posts 26 are connected at their upper ends to the rear posts 26 by means of corresponding connecting top plates 32.

A guide ridge 34 is provided on the bed plate 16 for engagement with a corresponding way formed in one of the rails 22 for guiding the sliding movement of the milling head carrier 24 upon the bed plate. The top plates 32 each mount an upright sleeve 40 which is laterally braced relative to its supporting plate by means of gussets 42. The sleeves 40 rotatably carry bolts 44 which extend therethrough and are supported at their upper ends thereon by means of shoulder portions 46. The lower ends of the bolts 44 are arranged to be screwthreaded into engagement with pins 45 extending into openings in opposite end portions of a cross head 48 which is mounted in vertically slidable relation between the upright posts 26 by means of tongue and groove devices as illustrated at 50 (Fig. 6). The bolts 44 are equipped at their upper ends with chain sprockets 52 for engagement with an endless chain 54 which coordinates movements of the bolts 44, and crank devices 58 are also operatively associated with the upper ends of the bolts 44 so that the latter may be adjusted from either side of the machine to any desired fixed position of vertical adjustment of the milling head carrier independently of the template controlled portions of the machine that will be described hereinafter.

Vertical adjustment of the cross head 48 by means of the screws 44 may be effected when no templet for controlling vertical sliding of the cross head 48 is present, whereby finishing operations involving no vertical sliding movement of the cross head 48 may be effected. The raising of the cross head 48 by means of the screws 44 may also be availed of to relieve the templet of its normal burden of supporting the cross head 48 vertically whereby templets may be removed and replaced conveniently. As shown in Fig. 5 of the drawings, the templet mechanism is operative and since the sprocket assemblies for controlling the screws 44 are resting upon the upper ends of the tubes supported by the plates 28 it must be assumed that the follower mechanism is operating upon a low point of the templet since otherwise the templet, through the cross head 48 and screws 44, would lift the sprocket mechanism vertically away from the tops of the tubes disposed between the plates 28 and the sprocket mechanism.

The cross head 48 is centrally hollowed at 60 to receive therein a milling head cradle 62 in such manner as to be rotatable therein about an axis extending longitudinally of the machine. For this purpose the cross head 48 is provided at its rear end with a wall portion 64 which is circularly grooved at 66 to receive therein a circular key portion 68 of the cradle 62 so that the latter is suspended in freely rotatable relation within the cross head. The front end of the cross head 48 is provided with a cover plate 70 bolted thereto as at 72 so as to complete the enclosure of the cradle 62 within the cross head unit; the front plate 70 being circularly grooved at 74 for slidable engagement therein of an extending annular key portion 76 of the cradle which corresponds to the key portion 68 at the opposite end thereof. Thus, the cradle 62 is enclosed and supported within the cross head 48 in freely rotatable relation therewithin about an axis extending longitudinally of the rails 22. The outer face of the cover plate 70 is arranged to bear in sliding relation against the front posts 26 so that the latter will maintain the cross head 48 in guided relation at the tongue and groove connections 50 with respect to the rear posts 26. The front posts 26 are arranged to be adjusted longitudinally of the machine so as to provide for gib adjustments and under all conditions a proper sliding fit and guiding action with respect to the cross head; and to this end the front posts 26 are connected to the corresponding rails 22 by means of bolts 75 extending through slotted openings in the foot ends of the posts. Adjustment screws 77 extending through upright end portions of the slide rails 22 bear against the lower ends of the front posts 26 so as to adjust the positions of the latter relative to the rails 22 and to eliminate possibility of play between the posts 26 and the cross head 48 when the latter is mounted therebetween. Thus, when the posts 26 are properly adjusted the bolts 75 may be tightened down so as to rigidly clamp the posts upon the rails 22. The cross head 48 and the cradle 62 are both cut away at their lower portions so as to straddle the work blank and its support.

The cradle 62 is illustrated as carrying a pair of milling cutters 80 mounted upon spindles 82 (Fig. 5) which in turn are rotatably carried within cylindrical housings 84 which also contain individual electric motors (not shown). The motor armatures are keyed to the spindles 82 as at 83 and the spindles 82 frictionally engage the outer tapered surfaces of the arbors of the cutters. Pull rods 86 extend through the centers of the motor units and are connected at their inner ends by screwthreaded means with the cutters 80 and are provided at their outer ends with adjustment nuts 87 for drawing the rods 86 outwardly so as to snugly seat the milling cutters within the spindles. The housings 84 extend in substantially end-to-end relation transversely of the axis of rotation of the cradle hereinabove referred to, and are so disposed as to position the lower cutting face portions of the milling cutters 80 at approximately the elevation of the axis of rotation of the cradle hereinabove referred to. However, means for separately adjusting the elevation of the cutting face portions of the milling cutters 80 are provided in the form of eccentric sleeves 90 which are generally of cylindrical form but internally bored eccentrically of the outer contour thereof to receive the housings 84 therein. Thus, the sleeves 90 are arranged to embrace the housings 84 and in turn to be rotatably mounted within the cradle 62 so that upon rotation of the sleeves 90 the milling cutter axes will revolve to different positions of elevation and displacement longitudinally of the work blank. To adjust and maintain the milling cutter spindles 82 within the cradle 62 a laterally extending arm 94 is provided at the outer end of each of the sleeves 90, and a dial plate 96 is rigidly mounted upon the cradle 62 adjacent each of the arms 94. The dial plates 96 are arcuately slotted as at 98 concentrically of the axes of revolution of the milling cutter spindles within the cradle and/or of rotation of the sleeves 90 within the cradle 62, and shouldered bolts 99 are mounted upon the arms 94 so as to extend through the slots 98 and to coact with the dial plates 96 in the manner of indexing devices indicating the positions of rotary adjustments of the sleeves 90 and to be adapted to be tightened subsequent to such adjustments so as to clamp the sleeves 90 against unintended rotation within the cradle. It will be noted that the adjustments of the milling cutters relative to the cradle 62 may be performed independently of one another, and that thereby the milling cutters 80 are individually adjustable to a large variety of positions of relative arrangement, as any case of use may require.

The milling cutters 80 are also relatively movable in axial directions to suit the requirements of different milling operations; and for this purpose the sleeves 90 are arranged to be separately moved axially within the cradle 62 by gears 100 mounted upon the cradle and extending into engagement with corresponding toothed racks 102 which are keyed to the sleeves 90 by sliding tongue and grove connections 104. The gears 100 are arranged to be rotated for adjusting movements of the spindles by manual turning of shafts 106 upon which the gears 100 are mounted.

Releasable lock means for maintaining the motor housings 84 in their various adjusted positions within the sleeves 90 are provided by forming the sleeves 90 with split housing portions at their ends and threading therethrough lock screws 111. Hence, subsequent to adjustments of the milling cutter housings within the cradle 62 the lock screws 111 may be tightened to clamp the elements together as a rigid integral unit.

Means for shifting the cross head 48 and the milling cutters as a unit therewith in vertical directions while the machine is in operation, as in connection with the milling of an irregular surface contour, are provided in the form of a template which is fixedly mounted upon the machine base and a template contact device which is operatively associated with the cross head. The template is illustrated in the drawings as being in the form of a plate 120 rigidly mounted upon the machine base by means of brackets and bolts 122 and extending longitudinally of the machine coextensive with the work blank to be milled. The template 120 is shaped at its lower edge portion 124 so as to correspond in longitudinal surface contour to the longitudinal surface contour to which the work blank is to be milled, as the milling head moves along the work blank. A template contact member in the form of a roller 126 is rotatably mounted upon a supporting arm 128 by means of a pin 130 which engages a bracket 132 adjustably mounted upon the arm 128 by means of a screw 134. The arm 128 is suspended upon an upper arm 136 between side flanges 137 thereof by means of a pivot pin 138, and a locking pin 140 is provided for insertion through registering openings through adjacent portions of the arms 128 and 136 for detachably locking the arms against relative pivotable movements about the pivot pin 138 during operation of the machine. Thus, the operator may conveniently disengage the template contact roller 126 from the template 120 for adjustments between operations of the machine by simply withdrawing the pin 140 from the arms so as to allow the arm 128 to be swung outwardly and upwardly away from the template plate.

The upper end of the arm 136 is pivotally connected at 141 to an adjustable jaw device 142 comprising a pair of links pivotally connected at 144 and adjustably conected in spaced relation at a position opposite to said pivotal connection 144 by means of a screw 146. A calibrated dial 148 is mounted upon the screw 146 to serve as a convenient manual adjustment device therefor and to indicate the condition of such adjustment. The jaw device 142 is pivotally connected at 149 to a lever arm 150 which extends laterally as an integral portion of a tube 152 rotatably mounted upon a shaft 154 which extends transversely of the machine and is carried at opposite sides thereof by a U-shaped bearing bracket 156. A second lever arm 160 generally similar in form and arrangement to that of the lever arm 150 is provided at the opposite end of the tube 152 and as an integral part thereof to extend rearwardly therefrom and substantially parallel to the arm 150. Adjustable weights 162 are mounted at the free ends of the lever arms 150 and 160 for counterbalancing the weight of the cross head and milling cutter unit as will be explained hereinafter. To this end the tube 152 is provided with a pair of spaced forwardly extending ears 164 disposed centrally of the machine and pivotally connected to a bearing block 166 disposed therebetween. The bearing block 166 carries a shaft 168 which is arranged to be manually rotated by a hand crank 170 at its upper end. The lower end of the shaft 168 is threaded into engagement with a block 172 which is pivotally connected to ears 174 extending from the upper end of the cross head 48.

Figure 2:
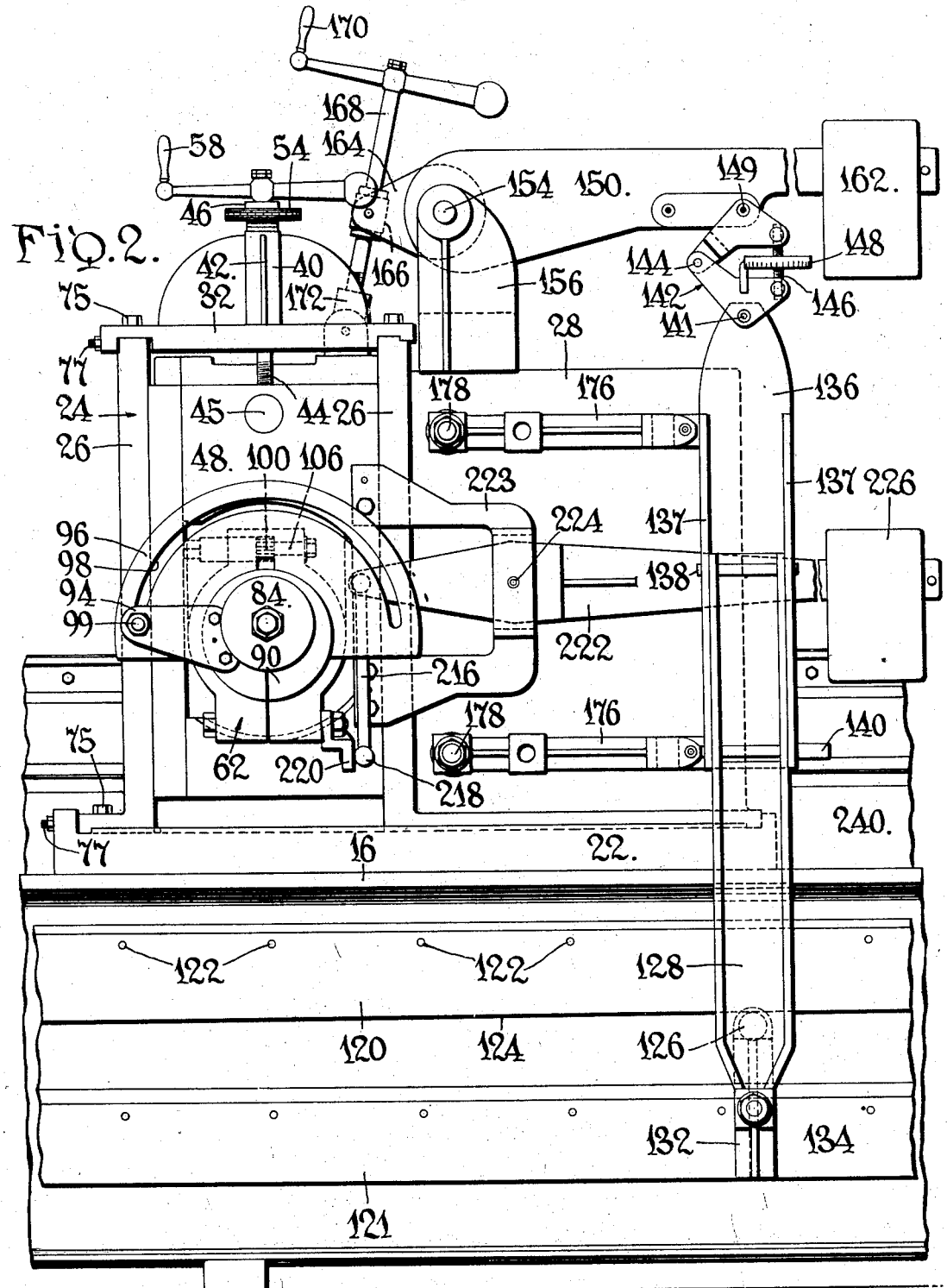
Fig. 2 is a fragmentary side elevation thereof.

The upper arm 136 is braced relative to the box-like housing of the milling head carrier by being pivotally connected to a pair of parallel links 176 which is turn are pivotally mounted upon a side plate member 28 by means of pins 178 (Fig. 2). Thus, the arm 136 is free to move vertically but is at all times maintained in rigidly upright attitude by the links 176 so that the lower roller supporting end of the arm 128 moves longitudinally of the machine coextensively with the milling head carrier at all times.

The counterweights 160 are so provided and arranged as to partially counteract the weight of the vertically slidable portion of the milling head unit, but the counterweight is so regulated that the roller 126 will at all times be borne snugly against the lower surface 124 of the template 120 under the action of the unbalanced portion of the weight of the milling head unit so that the roller 126 will accurately follow the contour of the template during movement of the milling head longitudinally of the work blank. The lever arms 150 and 164 are so relatively proportioned in the instance illustrated that the vertical movements of the cross head 48 are about one-fourth the magnitude of the corresponding vertical movements of the arm 136, and therefore the template 120 will be provided with a contour scaled vertically at about four times the desired contour change of the finished work piece. However, it will be understood that any other relative lever arm and corresponding template contour ratio may be employed, as desired.

Figure 3:
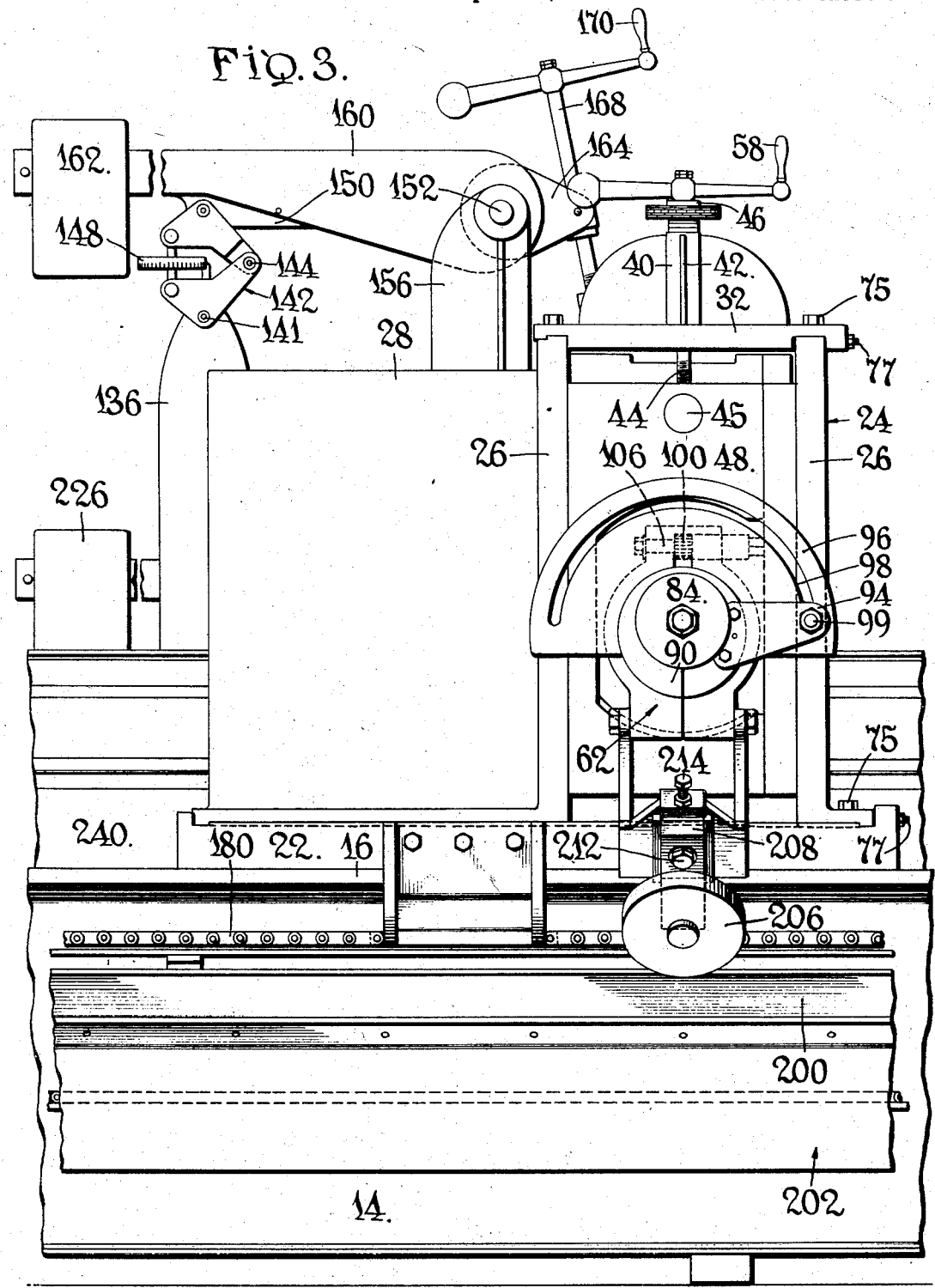
Fig. 3 is a fragmentary side elevation thereof at the side opposite to that of Fig. 2.
Figure 4:
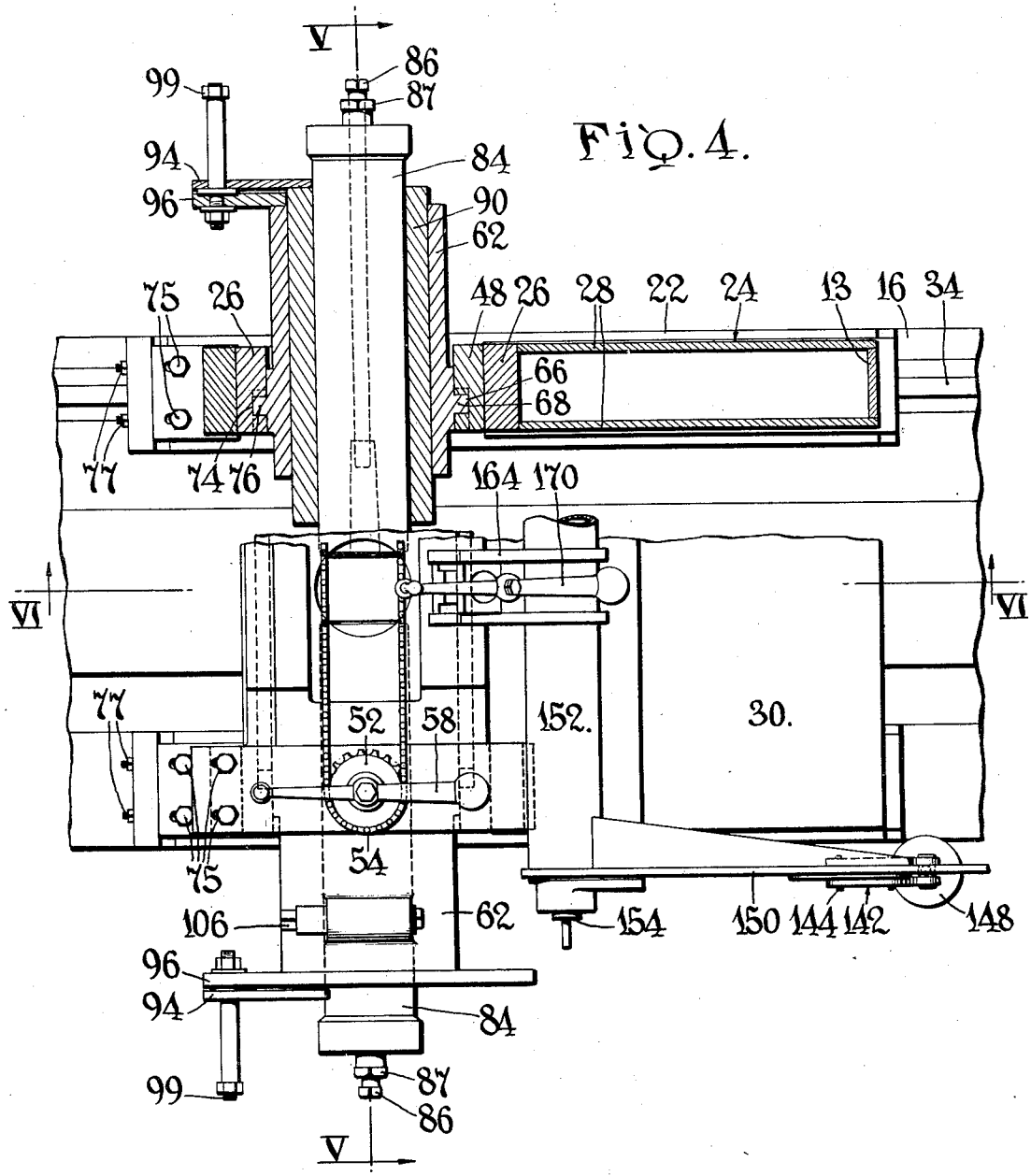
Fig. 4 is a fragmentary plan thereof with portions broken away.

Thus, the template 120 is adapted to automatically procure vertical adjustments of the milling head as it traverses the work blank in such manner that the milled surface will accurately conform to the prescribed shape thereof as designated by the shape of the template used. By varying the threaded adjustment of the rod 168 within the block 172 the relative positions of the milling head and the template plate contacting surface may be readily varied to suit different conditions of template plate arrangement, and to regulate the depth of the milling cuts. Additional adjustments of the screw 146 provide micrometrically fine adjustments in this respect. As illustrated in Fig. 3, an endless chain 180 operatively associated with any suitable drive mechanism (not shown) may be employed to provide the movement of the milling head unit longitudinally of the work blank, but it will be understood that in lieu of the chain 180 a feed screw or any other suitable motion transmitting device may be employed for the purpose.

As explained hereinabove, the cradle 62 carrying the milling cutters is rotatable about the longitudinal axis of the machine in a plane perpendicular to this axis so as to enable the cutters to mill the work blank to a surface of twisting contour. To this end a second template 200 is fastened to the side of the base 14 by means of a bracket 202 and connecting bolts 204. The template 200 is coextensive in length with the work blank and the upper edge of the template is contoured so as to provide the motion required to produce the desired sectional profile of the surface to be milled. A roller 206 is arranged to ride the contact edge of the template 200 and is rotatably mounted upon a bracket 208 connected to an arm 210 which extends as an integral portion of one end of the cradle 62 (Fig. 5). The bracket 208 is adjustably mounted upon the arm 210 by means of screws 212 and 214, so that adjustments may be made therein to suit different conditions of template mountings.

Figure 1:
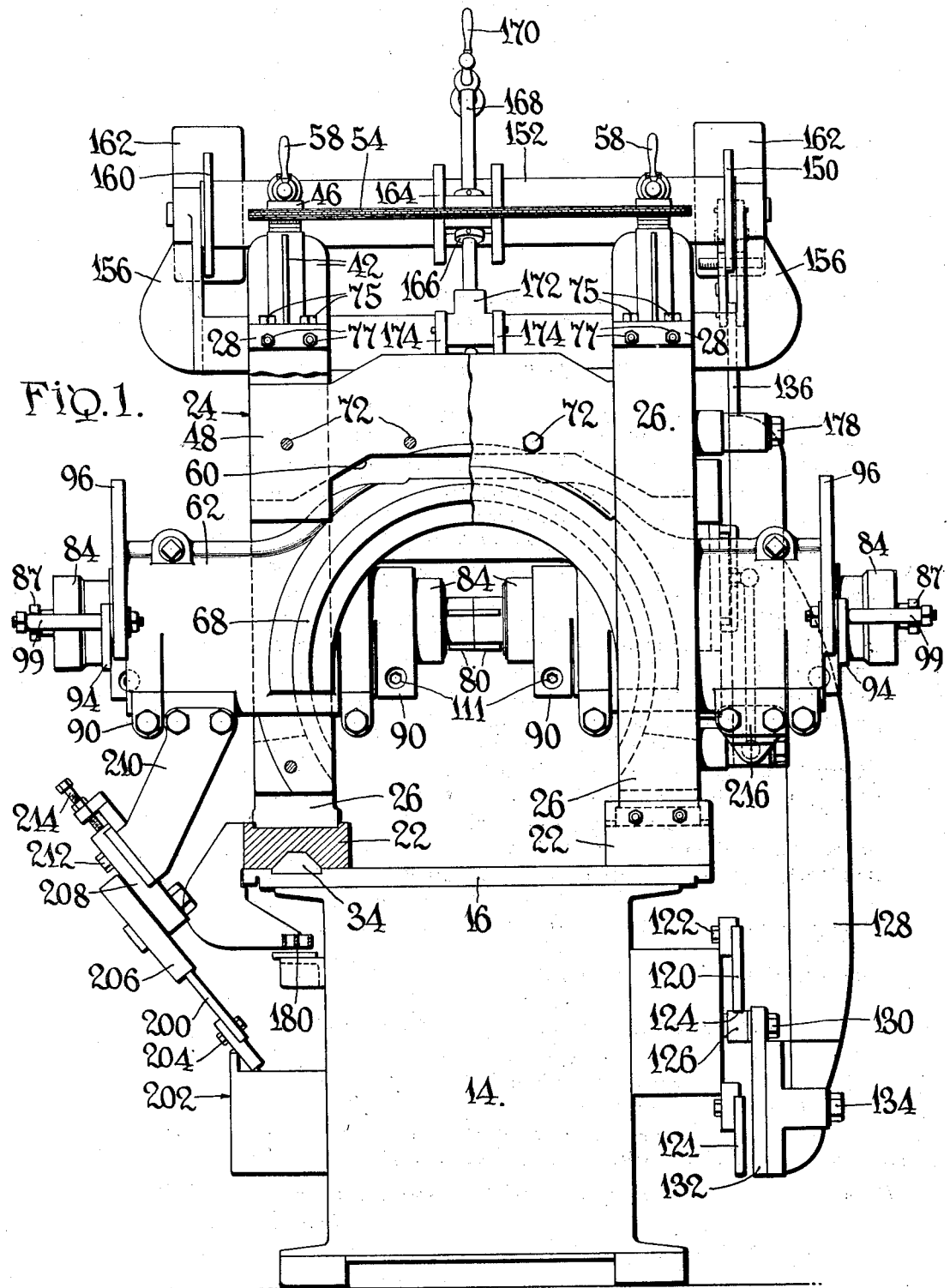

A link 216 is swivelly connected at 218 to a bracket 220 extending rigidly from the cradle 62 at its end portion opposite to the end thereof to which the template roller 206 is connected (Figs. 1 and 2). The link 216 is pivotally connected at its opposite end to a lever 222 which is in turn pivotally mounted upon a yoke 223 extending rigidly from the cross head 48 by means of a pin 224. The lever 222 carries at its opposite end a counterweight 226. Thus, the counterweight 226 tends at all times to cause the cradle 62 to rotate counterclockwise as viewed in Figs. 1 and 5, and the roller 206 is thereby maintained in snugly bearing relation against the contact edge of the template 200. Consequently, as the milling head carrier moves longitudinally of the work blank the template 200 causes the milling head cradle to rotate as required to cause the work piece surface to be milled to the prescribed transverse sectional profile thereof throughout its length. Thus, either uniformly level or sloping or twisting milled surfaces may be readily produced through use of appropriately shaped templates. Particular attention is called to that feature of the machine residing in the relative arrangement of the template roller and counterweight connections with the milling head cradle. As explained hereinabove, the cradle 62 is centrally apertured and cut away at its lower portion to accommodate the milling cutters and to span the work piece. Consequently, the cradle is generally of U shaped form and the template roller 206 bears upwardly against one end thereof while the counterweight 226 operates to lift upwardly against the other end thereof. Thus, these loadings upon the cradle tend to open the latter as distinguished from tending to close it in such manner as would otherwise clamp it at the tongue and groove connections 66, 68, 74, 76 upon the cradle 62 so as to bind the relatively moving parts of the mechanism. In this connection it will be noted that the annular tongue and groove connection is formed with great accuracy and the inner peripheries of the tongue and grooves will be in intimate contact under the influence of the weight of the cradle and the tendency of its lateral portions to reduce, in effect, the diameter of the tongues 68, 76. For this reason whatever tolerance is provided in the tongue and groove connection will be present at the outer peripheries of the tongues and grooves. It is for this reason that the loading of the cradle mentioned above avoids a clamping action between the annular tongues and grooves. It is also to be noted that the line of the template 200 and the roller 206 and its supporting bracket is disposed at about 50 degrees from the horizontal or substantially normal to the radius of rotation of the cradle 62 within the milling head carrier. Hence, the cradle rotation action is smooth and uniform and the contour of the contact edge of the template 200 may be laid out as a direct function of the desired rotation of the milling head unit to provide any desired twist in the finished milled surface.

Although the drawings and description hereinabove illustrate and describe a machine having opposed and substantially horizontal milling heads it will be understood that the cradle 62 may with equal facility be provided with additional milling heads disposed at any desired angle relative to the machine base. For example, the cradle 62 is illustrated in Figs. 5 and 6 as being bored at 230 to receive therewithin a vertically disposed milling head in the manner of the mounting of the milling head housings 84 hereinabove described. For this purpose the cross head 48 would also be centrally cored as at 232.

Although the driving motors and/or other power supply devices for driving the moving elements of the machine are not illustrated and described in detail herein, it will be understood by those skilled in the art how suitable power may be supplied to the various moving elements thereof without need of further reference thereto. Troughs 240 are illustrated in Fig. 5 as being arranged along each side of the work piece support 18 for collection of cuttings from the milling operation and subsequent removal therefrom by any suitable liquid flushing means, or the like. As illustrated in Figs. 1 and 5, another vertical movement template 121 may be positioned at the lower portion of the template supporting bracket; the roller supporting bracket 132 being adapted to be swung about the mounting screw 134 so as to move the roller 126 into operative position relative to either of the templates as may be required in connection with successive milling operations.

Thus, it will be understood that the invention provides a milling machine including multiple milling heads which are independently operable and independently adjustable in three directions within their supporting cradle. Hence, the machine is adapted to simultaneously mill different surfaces at different elevations. Also, the milling cutters 80 illustrated herein may be replaced by a single cutter extending between the two spindles so as to cut a single surface. Thus, the machine is adapted, for example, to mill the upper plate surface of the work piece 10 which is illustrated as being mounted upon the machine in Fig. 5 and it is also adapted to mill simultaneously the two under surfaces of the same plate portion at opposite sides of the vertical web thereof upon adjustment of the milling heads into spaced relation and mounting of the work piece in a reverse upright position. The twisted sectional form of the plate portion of the work piece illustrated herein is readily provided by use of a suitable template 200 so as to rotate the milling head carrier to proper inclined position. As explained hereinabove, through employment of templates 120 and 200 having varying contours the sectional profiles of the milled surfaces may be varied in any manner desired; and thus the machine is particularly adapted to produce in an improved manner and in accurately duplicated form, successive work pieces of tapered and/or twisted and/or intermittently milled surfaces.

Because of the fact that the milling heads are mounted within the cradle 62 which is in turn mounted within the cross head 48, the milling cutters constitute integral parts of a single heavy mass which is carried by the frame 24. By causing the cutter spindles 82 to rotate at relatively high rates of speed the ratio of the cutter speeds to the mass behind the cutters is such that the inertia of the mass is sufficient to damp any tendency of the cutters to chatter, and hence a further improvement in the quality of the workmanship of the machine is provided.

Although only one form of the invention has been shown and described in detail, it will be apparent to those skilled in the art that the invention is not so limited but that various changes may be made therein without departing from the spirit of the invention or the scope of the appended claims.

We claim:

1. In a milling machine, a work piece support, a milling head carrier movable longitudinally of said work piece support, a cross head slidably mounted within said carrier for vertical adjusting movements therein, a cradle mounted upon said cross head and rotatable thereon about an axis extending longitudinally of said work piece support, a milling cutter mounted upon said cradle and movable therewith as an element thereof, means for driving said milling cutter, means for moving said milling head carrier longitudinally of said work piece, and means automatically operable in response to said movement of said milling head carrier to cause said cradle to rotate upon said cross head, and means automatically operable in response to said movement of said milling head carrier to cause said cross head to move vertically within said carrier.

2. In a milling machine, a work piece support, a milling head carrier movable longitudinally of said work piece support, a cross head slidably mounted within said carrier for vertical adjusting movements therein, a cradle mounted upon said cross head and rotatable thereon about an axis extending longitudinally of said work piece support, a milling cutter mounted upon said cradle and movable therewith as an element thereof, means for driving said milling cutter, means for moving said milling head carrier longitudinally of said work piece, and means automatically operable in response to said movement of said milling head carrier to cause said cradle to rotate upon said cross head, said means comprising a template rigidly mounted relative to said work piece support and a template contact member extending rigidly from an end portion of said cradle.

3. In a milling machine, a work piece support, a milling head carrier movable longitudinally of said work piece support, a cross head slidably mounted within said carrier for vertical adjusting movements therein, a cradle mounted upon said cross head and rotatable thereon about an axis extending longitudinally of said work piece support, a milling cutter mounted upon said cradle and movable therewith as an element thereof, means for driving said milling cutter, means for moving said milling head carrier longitudinally of said work piece, and means automatically operable in response to said movement of said milling head carrier to cause said cradle to rotate upon said cross head, said means comprising a template rigidly mounted relative to said work piece support and a template contact member extending rigidly from an end portion of said cradle, and a counterweight operably associated with the opposite end of said cradle.

4. In a milling machine, a work piece support, a milling head carrier movable longitudinally of said work piece support, a cross head slidably mounted within said carrier for vertical adjusting movements therein, a U-shaped cradle straddling said work piece and mounted upon said cross head and rotatable thereon about an axis extending longitudinally of said work piece support, milling cutters mounted upon said cradle and movable therewith as an element thereof, means for driving said milling cutters, means for moving said milling head carrier longitudinally of said work piece, and means automatically operable in response to said movement of said milling head carrier to cause said cradle to rotate upon said cross head, said means comprising a template rigidly mounted relative to said work piece support and a template contact member extending rigidly from an end portion of said cradle, and a counterweight operably associated with the opposite end of said cradle in such manner that the loadings upon the cradle imposed by said template contact member and said counterweight tend to spread said U-shaped cradle.

5. In a milling machine, a work piece support, a milling head carrier movable longitudinally of said work piece support, a cross head slidably mounted within said carrier for vertical adjusting movements therein, a U-shaped cradle straddling said work piece and mounted upon said cross head and rotatable thereon about an axis extending longitudinally of said work piece support, milling cutters mounted upon said cradle and movable therewith as an element thereof, means for driving said milling cutters, means for moving said milling head carrier longitudinally of said work piece, and means automatically operable in response to said movement of said milling head carrier to cause said cradle to rotate upon said cross head, said means comprising a template rigidly mounted relative to said work piece support and a template contact member extending rigidly from an end portion of said cradle and a counterweight operably associated with the opposite end of said cradle in such manner that the loadings upon the cradle imposed by said template contact member and said counterweight tend to spread said U-shaped cradle, and means automatically operable in response to said movement of said milling head carrier to cause said cross head to move vertically to adjusted positions.

6. In a milling machine, a work piece support, a milling head carrier movable longitudinally of said work piece support, a cross head slidably mounted within said carrier for vertical adjusting movements therein, a U-shaped cradle straddling said work piece and mounted upon said cross head and rotatable thereon about an axis extending longitudinally of said work piece support, milling cutters mounted upon said cradle and movable therewith as an element thereof, means for driving said milling cutters, means for moving said milling head carrier longitudinally of said work piece, and means automatically operable in response to said movement of said milling head carrier to cause said cradle to rotate upon said cross head, said means comprising a template rigidly mounted relative to said work piece support and a template contact member extending rigidly from an end portion of said cradle and a counterweight operably associated with the opposite end of said cradle in such manner that the loadings upon the cradle imposed by said template contact member and said counterweight tend to spread said U-shaped cradle, and means automatically operable in response to said movement of said milling head carrier to cause said cross head to move vertically to adjusted positions, said last mentioned means comprising a template rigidly mounted relative to said work piece support and a template contact member operatively associated with said cross head by link means.

7. In a milling machine, a work piece support, a milling head carrier movable longitudinally of said work piece support, a cross head slidably mounted within said carrier for vertical adjusting movements therein, a U-shaped cradle straddling said work piece and mounted upon said cross head and rotatable thereon about an axis extending longitudinally of said work piece support, milling cutters mounted upon said cradle and movable therewith as an element thereof, means for driving said milling cutters, means for moving said milling head carrier longitudinally of said work piece, and means automatically operable in response to said movement of said milling head carrier to cause said cradle to rotate upon said cross head, said means comprising a template rigidly mounted relative to said work piece support and a template contact member extending rigidly from an end portion of said cradle and a counterweight operably associated with the opposite end of said cradle in such manner that the loadings upon the cradle imposed by said template contact member and said counterweight tend to spread said U-shaped cradle, and means automatically operable in response to said movement of said milling head carrier to cause said cross head to move vertically to adjusted positions, said last mentioned means comprising a template rigidly mounted upon relative to said work piece support and a template contact member operatively associated with said cross head by link means, said link means being adjustable as to length.

8. In a milling machine, a work piece support, a milling head carrier movable longitudinally of said work piece support, a cross head slidably mounted within said carrier for vertical adjusting movements therein, a cradle mounted upon said cross head and rotatable thereon about an axis extending longitudinally of said work piece support, opposed milling cutters mounted upon said cradle and movable therewith as an element thereof, means for driving said milling cutter, means for moving said milling head carrier longitudinally of said work piece, and means automatically operable in response to said movement of said milling head carrier to cause said cross head to move vertically within said carrier, said milling cutters being independently adjustable axially within said cradle, and revolvable about axes extending longitudinally thereof by and upon longitudinal movement of said milling head carrier.

9. In a milling machine, a work piece support, a milling head carrier movable longitudinally of said work piece support, a cross head slidably mounted within said carrier for vertical adjusting movements therein, a cradle mounted upon said cross head and rotatable thereon about an axis extending longitudinally of said work piece support, milling cutters mounted upon said cradle and movable therewith as an element thereof, means for driving said milling cutters, means for moving said milling head carrier longitudinally of said work piece, and means automatically operable in response to said movement of said milling head carrier to cause said cross head to move vertically within said carrier, said milling cutters being independently adjustable axially within said cradle, and means for independently revolving said cradle about axes extending longitudinally of the machine, said last mentioned means comprising a template rigidly mounted relative to said work piece support and a template contact member extending rigidly from an end portion of said cradle, and a counterweight operably associated with the opposite end of said cradle.

10. In a milling machine, a work piece support, a milling head carrier movable longitudinally of said work piece support, a cross head slidably mounted within said carrier for vertical adjusting movements therein, a cradle mounted upon said cross head and rotatable thereon about an axis extending longitudinally of said work piece support, milling cutters mounted upon said cradle and movable therewith as an element thereof, means for driving said milling cutters, means for moving said milling head carrier longitudinally of said work piece, means causing rotative movement of said cradle upon longitudinal movement of said carrier, and means automatically operable in response to said movement of said milling head carrier to cause said cross head to move vertically within said carrier, said milling cutters being independently adjustable axially within said cradle, said last mentioned means comprising a template rigidly mounted relative to said work piece support and a template contact member operatively associated with said cross head by link means.

11. In a milling machine, a work piece support, a milling head carrier movable longitudinally of said work piece support, a cross head slidably mounted within said carrier for vertical adjusting movements therein, a cradle mounted upon said cross head and rotatable thereon about an axis extending longitudinally of said work piece support, milling cutters mounted upon said cradle and movable therewith as an element thereof, means for driving said milling cutters, means for moving said milling head carrier longitudinally of said work piece, means causing rotative movement of said cradle upon longitudinal movement of said carrier, and means automatically operable in response to said movement of said milling head carrier to cause said cross head to move vertically within said carrier, said milling cutters being independently adjustable axially within said cradle and separately mounted within eccentric sleeves enclosed within said cradle.

12. In a milling machine, a work piece support, a milling head carrier movable longitudinally of said work piece support, a cross head slidably mounted within said carrier for vertical adjusting movements therein, a cradle mounted upon said cross head and rotatable thereon about an axis extending longitudinally of said work piece support, milling cutters mounted upon said cradle and movable therewith as an element thereof, means for driving said milling cutters, means for moving said milling head carrier longitudinally of said work piece, means causing rotative movement of said cradle upon longitudinal movement of said carrier, and means automatically operable in response to said movement of said milling head carrier to cause said cross head to move vertically within said carrier, said milling cutters being independently adjustable axially within said cradle and being separately mounted within eccentric sleeves enclosed within said cradle, said cradle and said sleeves being formed with split housing portions and clamping devices associated therewith for rigidly locking said cutters and sleeves and cradle together as a unit.

13. In a milling machine, a work piece support, a milling head carrier movable longitudinally of said work piece support, a cross head slidably mounted within said carrier for vertical adjusting movements therein, a U-shaped cradle straddling said work piece and mounted upon said cross head and rotatable thereon about an axis extending longitudinally of said work piece support, milling cutters mounted upon said cradle and movable therewith as an element thereof, means for driving said milling cutters, means for moving said milling head carrier longitudinally of said work piece, and means automatically operable in response to said movement of said milling head carrier to cause said cradle to rotate upon said cross head, said means comprising a template rigidly mounted relative to said work piece support and a template contact member extending rigidly from an end portion of said cradle and a counterweight operably associated with the opposite end of said cradle in such manner that the loadings upon the cradle imposed by said template contact member and said counterweight tend to spread said U-shaped cradle, and means automatically operable in response to said movement of said milling head carrier to cause said cross head to move vertically to adjusted positions, said last mentioned means comprising a template rigidly mounted upon relative to said work piece support and a template contact member operatively associated with said cross head by link means, said link device being mounted relative to said carrier by parallel pivoting arms.

14. In a milling machine, a work piece support, a milling head carrier movable longitudinally of said work piece support, a cross head slidably mounted within said carrier for vertical adjusting movements therein, a U-shaped cradle straddling said work piece and mounted upon said cross head and rotatable thereon about an axis extending longitudinally of said work piece support, milling cutters mounted upon said cradle and movable therewith as an element thereof, means for driving said milling cutters, means for moving said milling head carrier longitudinally of said work piece, and means automatically operable in response to said movement of said milling head carrier to cause said cradle to rotate upon said cross head, said means comprising a template rigidly mounted relative to said work piece support and a template contact member extending rigidly from an end portion of said cradle and a counterweight operably associated with the opposite end of said cradle in such manner that the loadings upon the cradle imposed by said template contact member and said counterweight tend to spread said U-shaped cradle, and means automatically operable in response to said movement of said milling head carrier to cause said cross head to move vertically to adjusted positions, said last mentioned means comprising a template rigidly mounted upon relative to said work piece support and a template contact member operatively associated with said cross head by link means, said link means being adjustable as to length and being mounted relative to said carrier by parallel pivoting arms.

15. In a milling machine, a work piece support, a milling head carrier movable longitudinally of said work piece support, a cross head slidably mounted within said carrier for vertical adjusting movements therein, a cradle mounted upon said cross head and rotatable thereon about an axis extending longitudinally of said work piece support, a milling cutter mounted upon said cradle and movable therewith as an element thereof, means for driving said milling cutter, means for moving said milling head carrier longitudinally of said work piece, and means automatically operable in response to said movement of said milling head carrier to cause said cradle to rotate upon said cross head, said last mentioned means comprising a template rigidly mounted relative to said work piece support and a template contact member extending rigidly from an end portion of said cradle, said template and said template contact meber being disposed in a line tangential to the circle of rotation of said cradle.

ARTHUR A. SCHWARTZ.
LE ROY F. MAURER.